J. L. TOWNSEND.
CLUTCH DEVICE.
APPLICATION FILED JAN. 12, 1917.
1,260,478.
Patented Mar. 26, 1918.
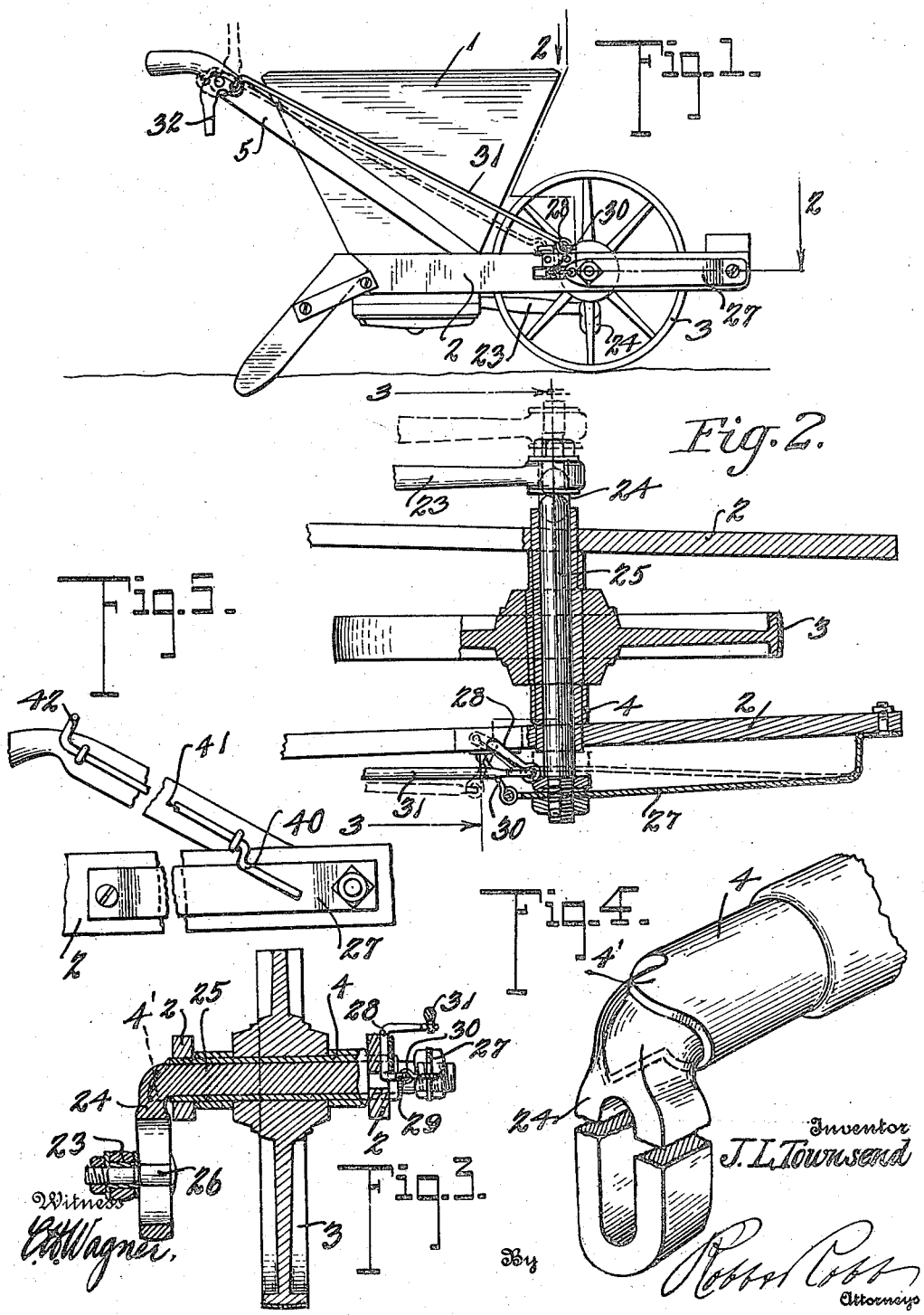

UNITED STATES PATENT OFFICE.

JAMES L. TOWNSEND, OF McDONALDS, NORTH CAROLINA.

CLUTCH DEVICE.

1,260,478.  Specification of Letters Patent.  Patented Mar. 26, 1918.

Original application filed May 22, 1916, Serial No. 99,141. Divided and this application filed January 12, 1917. Serial No. 142,016.

*To all whom it may concern:*

Be it known that I, JAMES L. TOWNSEND, a citizen of the United States, residing at McDonalds, in the county of Robeson and State of North Carolina, have invented certain new and useful Improvements in Clutch Devices, of which the following is a specification.

The present invention relates to improvements in clutch mechanism especially designed for agricultural implements of that type known as fertilizer distributers described in my copending application, Serial Number 99,141, filed May 22d, 1916, of which this is a division. Apparatus of the character referred to in said application comprises certain distributing mechanism embodying elements adapted to be oscillated through the instrumentality of the driving or ground wheel operatively connected thereto by the clutch mechanism, the latter constituting the special subject matter of this invention.

The objects and advantages of my invention will be hereinafter more fully described, claimed and illustrated in the accompanying drawing, wherein:

Figure 1 is a side elevation of an apparatus constructed in accordance with my invention.

Fig. 2 is a horizontal sectional view on the line 2—2 of Fig. 1.

Fig. 3 is a vertical sectional view on the line 3—3 of Fig. 2.

Fig. 4 is an enlarged perspective view of the driving shaft extremity and the coöperating crank shaft, interlocked with the clutch element of the former.

Fig. 5 is a fragmentary view showing a modified form of actuating means for the clutch mechanism.

Throughout the following detail description, and on the several figures of the drawing, similar parts are referred to by like reference characters.

Referring to the drawing, and specifically describing this apparatus, the numeral 1 designates a hopper of suitable size for containing the material which is to be distributed, such as fertilizer, said hopper being supported upon a frame 2 provided with the ground wheel 3 which in turn is fixedly mounted upon the hollow shaft 4.

The apparatus above generally described is capable of being moved over the surface in any desired manner and guided by means of the handle members 5 attached to the frame members 2. The material from this hopper is distributed by certain means which is described in the copending application above referred to and need not be particularly set forth in this description as it forms no part of my present invention. It is sufficient however, to state that said mechanism embodies a member adapted to be oscillated and this member is connected by means of the connecting rod 23 to the pin 26, secured to the crank arm 24 which is formed by bending the end of the shaft 25 at a right angle, said shaft being shiftably mounted in the hollow shaft 4 to which the ground wheel 3 is secured. The crank arm 24, as will be noted in Figs. 3 and 4 is slotted to provide for adjustment of the connection 26 for the connecting rod 23 so that said rod may be easily adjusted to increase or decrease the agitation of the distributing means incident to movement of the apparatus over the surface in the operation of the distributer. One extremity of the hollow shaft 4 is provided with clutch elements 4' with which the crank arm 24 of the shaft 25 interlocks to cause rotation of the shaft 25 throughout the revolution of the wheel 3. The clutch connection just described is maintained by a spring 27 secured at one end to the forward extremity of the frame 2 and connected intermediate its length to the shaft 25, said spring normally tending to hold the arm 24 in engagement with the elements 4'. In order to disconnect the clutch means at will so as to enable movement of the vehicle without actuation of the distributing means, I provide a vertically arranged rock shaft 28 on the frame 2 at one side of the hopper, the lower extremity of said shaft having a lateral arm 29 connected by a link 30 to the end of the spring 27. The upper arm of the shaft 28 has connected thereto a rod 31 provided at its rear extremity with a manipulating grip piece or lever 32 arranged at a convenient position with respect to a handle 5 for manipulation by the operator of the machine. Upon actuation of the lever 32 the rock shaft 28 will cause the spring 27 to move laterally carrying the shaft 25 therewith and disconnecting the crank arm 24 from the clutch elements 4', in which condition the vehicle may be moved without operating the distributing means.

The actuating means just described for shifting the spring or tension means 27 may readily be modified in a manner such as suggested by Fig. 5 of the drawing. In the latter the lower angularly bent extremity 40 of the rod 41 is arranged adjacent to the movable end of the spring 27, this angularly bent extremity constituting a cam which upon rotation of the rod 40 by manipulation of the handle 42 will shift the spring 27 and the shaft 25 therewith whereby to disconnect the clutch and thus the drive to the driven member.

Having thus described my invention, what I claim as new is:

1. Clutch mechanism of the class described comprising a driving shaft terminating in a clutch element, a driven shaft mounted therein and having a crank arm engageable with said clutch element, tension means connected to said driven shaft and normally holding the crank arm of the same in interlocking connection with the clutch element, and rotatable means connected to said tension means for releasing the tension on said driven shaft to thereby disconnect the clutch.

2. The combination with a wheeled implement including a frame, of a hollow driving shaft journaled on said frame, a crank shaft shiftably mounted in said hollow shaft and having a crank arm at one end thereof, said driving shaft terminating in a clutch element at the end thereof corresponding to the end of the crank shaft having the crank arm, a spring connected at one end to the frame and at its other end to the crank shaft, said spring normally holding the crank arm interlocked with the clutch element, and means revolubly mounted upon the frame for moving the spring laterally thereby to shift the crank shaft and disengage its crank arm from the clutch element.

3. In apparatus of the class described comprising a driving shaft, a driven shaft mounted thereon, clutch means for connecting said driven shaft with the driving shaft, a spring secured adjacent to the driven shaft and connected at one end to the driven shaft, said spring constituting an operative element for the driven shaft, and operating means coöperating with the aforesaid end of the spring for shifting the spring laterally and the driven shaft bodily therewith.

4. In apparatus of the class described comprising a wheeled frame, a driving shaft mounted on said frame, a crank shaft shiftably mounted in said driving shaft, a spring secured at one end to the frame and to the crank shaft at its other end, manually operating means mounted on said frame and having angular means at one end coöperating with the last mentioned end of the spring for shifting the said spring laterally and the crank shaft bodily therewith, and clutch means intermediate said crank and driving shafts.

In testimony whereof I affix my signature.

JAMES L. TOWNSEND.

Copies of this patent may be obtained for five cents each, by addressing the "Commissioner of Patents, Washington, D. C."